Patented Apr. 6, 1943

2,315,718

UNITED STATES PATENT OFFICE 2,315,718

MOPPING COMPOUND

William J. Lilpfert, Fort Valley, Ga., assignor to Woolfolk Chemical Works, Limited, Fort Valley, Ga., a partnership No Drawing. Application August 22, 1940, Serial No. 353,684

2 Claims. (Cl. 167—15)

The invention relates to a mixture for use in treating cotton plants for the destruction of the boll weevil and the particular object is to provide such material in dry form, ready upon admixture with water for use in the so-called mopping method.

In recent years the so-called mopping method of fighting the boll weevil on cotton has gained the support of experiment stations and its use has been widely adopted by cotton growers. The mixture used for this purpose consists of one pound calcium arsenate, one gallon of Black Strap molasses, and one gallon of water, in which mixture the relation of the arsenate (by weight) to the water, is about 1:8. This quantity of mixture represents the amount required for approximately one acre. The mixture is applied by means of a mop made of rags fastened to the end of a stick or by means of mechanical mopping machines which are designed to achieve the same effect. Such mopping is customarily started when the young cotton plant has about six leaves and is continued at weekly intervals until the weevils are under control or the plants are so large as to make mopping impractical.

At the present time there is still a difference of opinion as to the merits of a sweet mixture as compared with one that is not sweetened, but public opinion is preponderantly in favor of the sweetened mixture. Aside from any value it may possess due to its sweetness, the molasses increases the viscosity, thus providing a more suitable mixture from a physical point of view, i. e., makes a sticky mass that will adhere to the plant. It has the power to a limited degree of holding and reabsorbing moisture. These are all desirable qualities that a mopping mixture should possess.

The use of molasses, however, has certain drawbacks:

(1) Expense: Molasses costs from 12½¢ to 25¢ per gallon, which makes the cost of the conditioner for the mixture from two to four times as much as the cost of the calcium arsenate which is the active ingredient.

(2) It is a "messy" material to mix and use and creates a dispensing problem for the merchant. A large percentage of the calcium arsenate used reaches the consumer through the medium of the small cross-roads store. These small merchants are for the most part not in a position to buy molasses in bulk and to repack it and generally speaking they are quite reluctant in the matter of handling it at all.

(3) The mixture once made has to be used on the same day because fermentation releases arsenate which results in plant injury.

Bearing these several matters in mind, applicant devoted his attention to the creation, if possible, of a mixture which would be in dry powdered form, that would simply need to be mixed with water to provide a suspension or fluid mixture possessing the desired qualities. A number of materials were found to impart the desired physical qualities but the most satisfactory one, largely on account of its low cost, was bentonite. 40% powdered bentonite, 50% calcium arsenate, and 10% powdered sugar supplies a dry composition which is packageable in bags containing two pounds, each providing a unit to be mixed with two gallons of water.

The cost of such a mixture is manifestly much less than an equivalent quantity of the molasses mixture and the time-saving convenience both to the user and to the merchant as provided by the dry unit package of this new product represents an improvement of real economic importance.

A comparison of the physical qualities of the new mixture with the thus far standard molasses shows the following:

(a) *Viscosity.*—The bentonite mixture is five times more viscous than the molasses mixture.

(b) *Adhesive properties.*—Leaves dipped in bentonite mixture pick up seven times the material picked up by the same leaves dipped into molasses mixture. There is no loss by dripping from the bentonite-dipped leaf, but 64% loss from the molasses-dipped leaf.

(c) *Weathering.*—When subjected to artificial rain bentonite mixture loss, 36%; molasses mixtureture loss, 98%.

(d) *Homogeneity.*—The bentonite mixture shows no appreciable separation after twenty-four hours. The molasses mixture shows practically complete settling of solids in this time.

(e) *Deterioration.*—None for the bentonite mixture; distinctive fermentation is within less than 24 hours for the molasses mixture.

The above qualities indicate the superiority of the new product over the molasses mixture and these qualities are ones that are of considerable importance for any type of material designed for use in mopping cotton.

In place of calcium arsenate, other arsenical or poisonous arsenates or arsenites having equivalent insecticidal potency may be used, provided they are of a character that, when in admixture with about an equal weight of bentonite, the compound when mixed with water in the proportion of approximately two pounds to two gallons will provide a paste possessing the above-described characteristics and which makes said mixture suitable for mopping cotton will satisfy the requirements, but more particularly a mixture as above described or one made up of approximately 50% calcium arsenate and 50% powdered bentonite without sugar or other dry sweetening agent is preferred.

I am aware that mixtures of bentonite and parasiticidal agents have been heretofore proposed for use as a dust or spray or for forming a hard coating on potato seeds and other seeds, but in all such cases there has either been an excess or an insufficient amount of bentonite to make it possible to use such compositions for applicant's purpose of mopping cotton plants. Applicant's mixture is not designed for use as a spray or dust or for dipping, but for application by hand-mopping or machine-mopping to the growing plants. For such a purpose a mixture which is over-concentrated with respect to bentonite so as to form a hard coating around a cut potato, is out of the question, and on the other hand a mixture which is so dilute as to be capable of use as a spray necessarily contains altogether too little bentonite to supply the necessary adhesive and viscous qualities which are indispensable in the mopping process. In applicant's mixture such factors as adhesiveness, water holding and absorption properties are important but the main point is the production of a homogeneous viscous or pasty mixture with water when used at the customary concentration recommended for the calcium arsenate-molasses-water mixture so that the mixture will possess the requisite characteristics necessary for application to the plants by hand-mopping or machine-mopping.

I claim:

1. A mopping composition in dry form comprising approximately 50% by weight of a powdered arsenical poison and approximately 40% to 50% by weight of powdered bentonite, the powdered arsenical poison and the powdered bentonite being thoroughly commingled in a substantially dry, powdered condition, the particles of arsenical poison and bentonite in the composition being individual and having substantially the same chemical and physical characteristics they initially possessed prior to their being commingled and the said bentonite having the power to absorb a sufficient amount of water to form a highly adhesive and viscous paste, said composition being capable of withstanding deterioration for substantially long periods and being capable upon being mixed in the proportion of about one part by weight of the composition to about eight parts by weight of water, of forming a non-sprayable, non-dustable, paste having such high adhesiveness and viscosity as to make it capable of being applied to plants as a thick layer by the mopping method and of being retained on the plants without any substantial loss by dripping and having such homogeneity that there is no appreciable separation of the solids for approximately twenty-four hours, whereby the arsenical poison and the bentonite can be evenly distributed by the mopping method upon the plants for the destruction of plant pests such as the boll weevil.

2. A mopping composition for use in the protection of cotton plants from injury by boll weevils, said composition containing arsenical poison, water and bentonite having the power to absorb a sufficient amount of water to form a highly adhesive and viscous paste, the weight of bentonite in the composition being equal to approximately from 80% to 100% of the weight of the arsenical poison, and the bentonite and arsenical poison being substantially evenly distributed and together forming approximately 11% by weight of the composition, and said composition forming a non-sprayable, non-dustable paste having such high adhesiveness and viscosity as to make it capable of being applied to plants as a thick layer by a mopping method and of being retained on the plants without any substantial loss by dripping and having such homogeneity that there is no appreciable separation of the solids for approximately twenty-four hours whereby the arsenical poison and bentonite in the composition can be evenly distributed upon the plants by the mopping method.

WILLIAM J. LIIPFERT.